No. 832,835. PATENTED OCT. 9, 1906.
S. L. BODINE.
METHOD OF DRAWING HOLLOW GLASS ARTICLES.
APPLICATION FILED SEPT. 28, 1904.
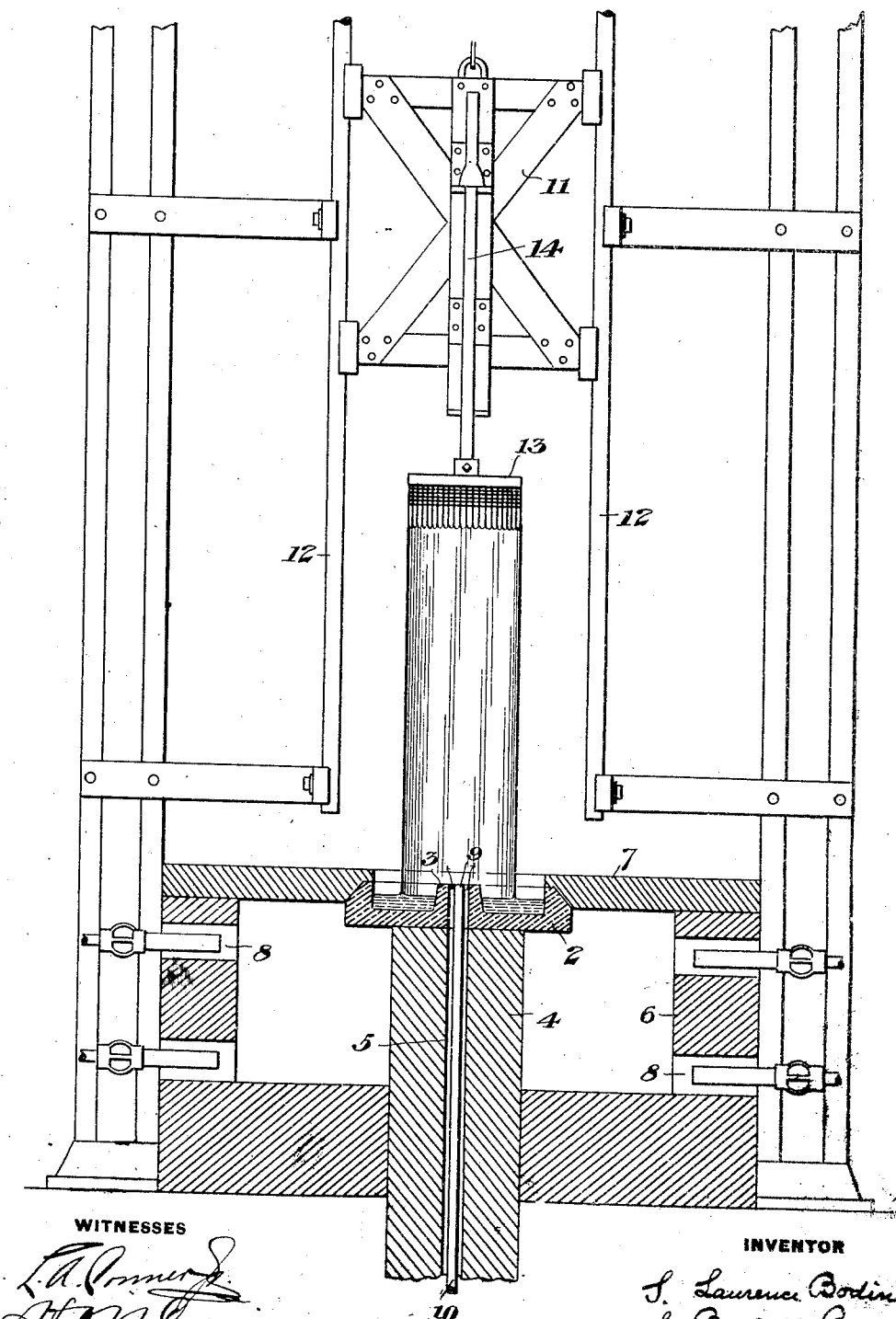
WITNESSES
INVENTOR

UNITED STATES PATENT OFFICE.

SAMUEL LAURENCE BODINE, OF BERWYN, PENNSYLVANIA, ASSIGNOR TO WINDOW GLASS MACHINE COMPANY, OF PITTSBURG, PENNSYLVANIA, A CORPORATION OF NEW JERSEY.

METHOD OF DRAWING HOLLOW GLASS ARTICLES.

No. 832,835.      Specification of Letters Patent.      Patented Oct. 9, 1906.

Application filed September 28, 1904. Serial No. 226,256.

*To all whom it may concern:*

Be it known that I, SAMUEL LAURENCE BODINE, of Berwyn, Chester county, Pennsylvania, have invented a new and useful Method of Drawing Hollow Glass Articles, of which the following is a full, clear, and exact description, reference being had to the accompanying drawing, forming part of this specification, in which the figure is a sectional side elevation showing apparatus arranged in accordance with my invention.

Heretofore in the drawing of hollow or inclosed glass articles without the use of a core it has been considered necessary to supply air under pressure to the interior of the article in order to hold the article to the desired size and prevent drawing in or contracting of the article during drawing. I have discovered that such articles can be drawn from a glass-bath without the admission of air under pressure, the size of the article being regulated during drawing by the heat applied and the drawing in being thus prevented—that is, by raising or lowering the temperature of the glass in the pot or receptacle I can increase or decrease the size of the article during the drawing operation. If the article tends to contract, by cooling the glass in the pot the size of the article will increase and the point of drawing be moved out toward the walls of the pot. I am thus enabled to do away with the entire complicated system of air-supply and draw with substantially atmospheric pressure upon the interior of the article, while maintaining the desired size.

In the drawing, in which I have shown the invention as applied to the drawing of a roller or cylinder to be cracked open or flattened for making window-glass, 2 represents the glass-pot, which is preferably formed with a central hollow boss or projection 3. This pot may be set upon a vertically-movable block 4, having a hole 5 registering with the hole in the pot, this block having suitable connections arranged to raise and lower it within the furnace 6. The furnace-chamber may be provided with a top stone 7, having a large hole and seat to receive the pot and cut off the point of drawing from the heat in the furnace-chamber. I have shown gas-burners 8 for heating this chamber and also a burner 9 within the hole in the pot, this burner being at the end of a supply-pipe 10, through which a mixture of air and gas is led to the burner. I preferably make the burner and pipe of less diameter than the hole, so that atmospheric air may flow into the interior of the cylinder or article being drawn.

The usual drawing apparatus may be employed for the vertically-movable frame 11 with guides 12. The bait 13, supported on the adjustable rod 14, may be provided with a surrounding bait of any desirable form, such as the wire bait of the Pease patent, No. 758,560, or the bait of the Lubbers patents, Nos. 743,898 and 758,544. This bait is preferably arranged to allow free communication between the outer air and the interior of the article.

The drawing is carried out in the usual manner except that the heat applied to the pot is regulated to keep the plasticity of the glass at such a point that the cylinder will remain of the same diameter during drawing. The inner burner supplies heated gases to the interior of the article during drawing, and in the form shown the air-current will pass up through the article.

The advantages of my invention result from doing away with the system of air under pressure and the regulating of the size and the shape of the article by heat regulation on the pot or receptacle. The forming of a glass neck and cap is also avoided. After the cylinder is drawn it may be cut off at the lower end by shears or by lowering the pot to allow the flames to sever the connection.

The interior burner may be done away with and the bait and drawing system may be widely varied. I may draw a cylinder having an opening extending along one side throughout its length by using a bait with a gap on one side, thus drawing an inclosed article which will do away with the necessity for cracking along one side. By the word "inclosed" in the claims I intend to cover the article, whether completely inclosed or partially so.

I claim—

1. The method of forming inclosed glass articles, consisting in lowering a bait into a bath of molten glass, and drawing a hollow article upwardly therefrom under substantially atmospheric pressure on the interior, and regulating the size of the article by heat regulation of the glass in the bath; substantially as described.

2. The method of forming inclosed glass articles, consisting in attaching the lower edge of a bait to the upper portion of a molten-glass bath, gradually separating the bait and the bath and drawing the hollow article out of contact with any shaping-surface, while maintaining substantial atmospheric pressure on the interior of the article; substantially as described.

3. The method of forming hollow glass articles consisting in drawing them from a glass-bath and supplying heated air or gases to the interior of the article during drawing; substantially as described.

4. The method of forming glass articles laterally inclosed around the entire circumference consisting in drawing them from a bath under substantially atmospheric pressure on the interior and regulating the size by heat regulation of the glass; substantially as described.

5. The method of forming a glass cylinder, consisting in attaching the lower part of a bait to the upper portion of a molten-glass bath, separating the bait and bath, and drawing the cylinder vertically out of contact with any shaping surface while allowing the air under atmospheric pressure to flow into the said article through the bait; substantially as described.

6. The method of forming inclosed glass articles consisting in drawing them from a glass-bath and directing a flame into the interior of the article during drawing; substantially as described.

7. The method of forming inclosed glass articles, consisting in applying heat to the lower part of a receptacle containing molten glass, cutting off the heat from the drawing-point, engaging the lower edge of a bait with the glass of the bath, drawing the glass article vertically under substantially atmospheric pressure on the interior, and regulating the size of the article by heat regulation of the glass in the bath; substantially as described.

8. The method of forming inclosed glass articles, consisting in attaching the lower portion of a bait to the upper portion of a molten-glass bath, separating the bait and bath to draw a hollow article, and regulating the size of the article by heat regulation of the glass in the bath; substantially as described.

In testimony whereof I have hereunto set my hand.

SAMUEL LAURENCE BODINE.

Witnesses:
GEO. B. BLEMING.
JOHN MILLER.